United States Patent [19]
Maloney

[11] Patent Number: 5,956,219
[45] Date of Patent: Sep. 21, 1999

[54] HIGH VOLTAGE POWER SUPPLY CLAMP CIRCUITRY FOR ELECTROSTATIC DISCHARGE (ESD) PROTECTION

[75] Inventor: Timothy J. Maloney, Palo Alto, Calif.

[73] Assignee: Intel Corporation, Santa Clara, Calif.

[21] Appl. No.: 09/093,376

[22] Filed: Jun. 8, 1998

[51] Int. Cl.⁶ .................................................. H02H 3/22
[52] U.S. Cl. .......................................... 361/56; 361/111
[58] Field of Search ................................ 361/56, 91, 111

[56] References Cited

U.S. PATENT DOCUMENTS

| | | | |
|---|---|---|---|
| 5,568,345 | 10/1996 | Mudd et al. | 361/56 |
| 5,719,737 | 2/1998 | Maloney | 361/111 |
| 5,784,242 | 7/1998 | Watt | 361/111 |
| 5,825,603 | 10/1998 | Parat et al. | 361/111 |
| 5,835,328 | 11/1998 | Maloney et al. | 361/111 |

OTHER PUBLICATIONS

Grove, A., *Physics and Technology of Semiconductor Devices*, John Wiley & Sons, Pubs., New York, 3 pages, (1967).

Merrill, R., et al., "ESD Design Methodology", *Electrical Overstress/Electrostatic Discharge Symposium Proceedings*, 6 pages (Sep. 28–30, 199)

Wann, C., et al., "High–Performance 0.07–um CMOS with 9.5–ps Gate Delay and 150 GHz ft", *IEEE Electron Device Letters*, vol. 18, No. 12, pp. 625–627, (Dec. 1997).

Worley, E.R., et al., "Sub–micron Chip ESD Protection Schemes Which Avoid Avalanching Junctions", *EOS/ESD Symposium*, 9 pages, (Sep. 1995).

Primary Examiner—Michael J. Sherry
Attorney, Agent, or Firm—Schwegman, Lundberg, Woessner & Kluth P.A.

[57] ABSTRACT

Clamp circuitry capable of providing ESD protection to a high voltage supply connection is provided. The clamp circuitry increases the area efficiency of ESD power supply clamping circuitry to sink larger currents during an ESD event, while maintaining backward compatibility with the higher voltage requirements of older ICs. The voltage clamp circuits include two discharge transistors which are controlled by a control circuit. The control circuit couples the gates of the discharge transistors to ground during an ESD event.

23 Claims, 4 Drawing Sheets

HIGH VOLTAGE POWER SUPPLY CLAMP CIRCUITRY FOR ELECTROSTATIC DISCHARGE (ESD) PROTECTION

FIELD OF THE INVENTION

The present invention relates generally to electrostatic discharge protection and in particular the present invention relates to protection circuitry for sinking current during an electrostatic discharge.

BACKGROUND OF THE INVENTION

Integrated circuits (ICs) are typically manufactured with external connections for receiving either power supply voltages, control or communication signals with external devices or systems. The trend in fabricating ICs is to increase the density of internal components, such as transistors and interconnects. In addition, the power supply potential used to operate the integrated circuits continues to decrease.

As integrated circuit devices increase in density and operating supply voltages decrease, the integrated circuits become more sensitive to the effects of electrostatic discharge. Electrostatic discharge (ESD) refers to the phenomenon of electrical discharge of high current for a short time duration resulting from a build up of static charge on a particular integrated circuit package, or on a nearby human handling that particular IC package. ESD is a serious problem for semiconductor devices since it has the potential to destroy an entire IC. Because ESD events occur often across the silicon circuits attached to IC package terminals, circuit designers have concentrated their efforts on developing adequate protection mechanisms for these sensitive circuits.

One solution is the use of a grounded gate transistor as a simple ESD protection circuit. The transistor is configured as a diode and has a drain junction breakdown voltage lower than the gate dielectric breakdown voltage. While this circuit provides some protection from ESD events, an ESD protection circuit should be able to protect an IC against static discharge by non-destructively passing large currents through a low impedance path in a short time.

One difficulty in designing ESD protection circuits is the demanding performance requirements that must be met. For example, one of the primary industry standards for measuring ESD robustness (MIL-STD-883C method 3015.7 Notice 8 (1989), and its follow-on Human Body Model (HBM) standard No. 5.1 (1993) from the EOS/ESD Association) requires ESD zapping for what can be a large number of pin and power supply combinations. In the past ESD protection circuits have had difficulty meeting these stringent requirements while maintaining adequate noise immunity.

During HBM tests, integrated circuits are subjected to repeated stressing of the power supply rails, often leading to premature failure of various breakdown points, such as the Vcc lines. A reliable power supply clamp is needed to reduce the susceptibility of the Vcc bus to failure mechanisms related to ESD testing. Further, ESD protection of input and output pins becomes simpler with a reliable power supply clamp because ESD current can be routed to one supply or another.

As supply voltages scale down (e.g., from 5.0 volts, to 3.3 volts, to 2.5, to 1.8 volts), backward compatibility with the higher voltage requirements of older ICs is needed. An electrostatic discharge (ESD) clamp circuit employing stacked p-type metal oxide semiconductor (PMOS) transistors is described in detail in U.S. patent application Ser. No. 08/823,109, filed Mar. 24, 1997 entitled "MOSFET-based Power Supply Clamps for Electrostatic Discharge Protection of Integrated Circuits." The high voltage clamp has series coupled transistors which form a switchable conductive circuit between a high voltage supply and ground. These transistors are turned off during non-ESD events, but activated during an ESD event to provide a discharge path for an ESD current. The gates of these discharge transistors are not driven fully to ground. Thus, the transistors do not dissipate the maximum possible current from the supply node.

For the reasons stated above, there is a need in the art for a circuit which increases the efficiency of ESD power supply clamping circuitry to sink larger currents during an ESD event, while maintaining backward compatibility with the higher voltage requirements of older ICs.

SUMMARY OF THE INVENTION

In one embodiment, a power supply clamp circuit comprising a switchable current sinking circuit connected to a power supply, and a control circuit coupled to a control connection of the switchable current sinking circuit. The control circuit adapted to couple the control connection to ground during an electrostatic discharge event on the power supply connection.

In another embodiment, a power supply clamp circuit comprises series connected p-channel transistors connected between a power supply connection and ground for providing a discharge path during an electrostatic discharge event on the power supply connection. A control circuit is coupled to gates of the series connected p-channel transistors, and adapted to couple the gates of the series connected p-channel transistors to substrate ground during the electrostatic discharge event.

In yet another embodiment, an integrated circuit comprises a power supply connection for receiving a power supply voltage, internal circuitry for performing a predetermined function, and a power supply clamp circuit for providing a discharge path during an electrostatic discharge event on the power supply connection. The power supply clamp circuit comprises a plurality of transistors connected in series between a power supply connection and ground, and a control circuit coupled to a gate of the transistors. The control circuit is adapted to couple the gates to substrate ground during an electrostatic discharge event on the power supply connection.

A power supply clamp circuit is described herein which comprises a switchable current sinking circuit connected to a power supply for providing a current sinking path for use during electrostatic discharge events on the power supply. A control circuit is connected to a control connection of the switchable current sinking circuit. The control circuit includes an RC network adapted to limit exposure of high voltage to the control connection to a predetermined time.

DETAILED DESCRIPTION OF THE INVENTION

Figure 1:
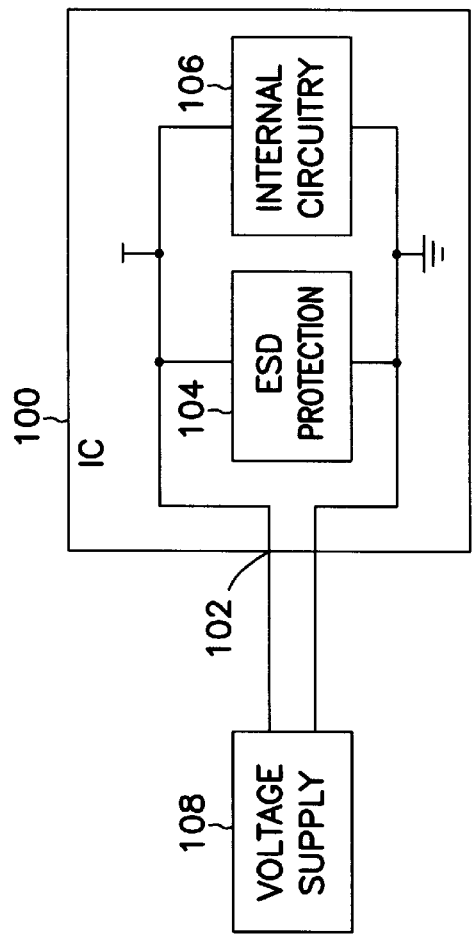
FIG. 1 is a block diagram of an integrated circuit according to one embodiment of the present invention.

In the following detailed description of the invention, reference is made to the accompanying drawings which form a part hereof, and in which is shown, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

An embodiment of the present invention provides clamping circuitry for use in electrostatic discharge where PMOS discharge transistors are provided for sinking large currents to improve protection during ESD events. FIG. 1 is a block diagram of an integrated circuit 100 which has a voltage supply input connection 102 for receiving an externally provided high supply voltage from supply circuit 108. An ESD protection circuit 104 is provided to protect internal circuitry 106, designed to perform a predetermined function, from electrostatic discharge. The protection circuitry is described in detail below. The integrated circuit 100 can be any type of integrated circuit which receives a supply voltage, including, but not limited to, processors, controllers, memory devices, and application specific integrated circuits (ASIC).

Figure 2:
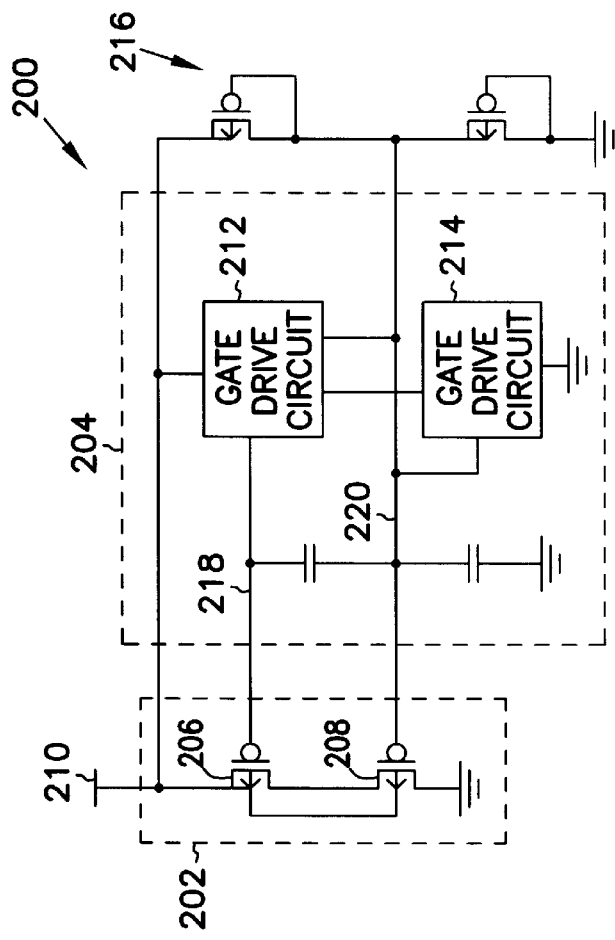
FIG. 2 is a clamp circuit having a stacked-gate PMOS transistor.

FIG. 2 is a PMOS clamp circuit 200 for use in high voltage tolerant circuits. The electrostatic discharge (ESD) clamp circuit includes stacked PMOS transistors. Again, as supply voltages scale down, backward compatibility with the higher voltage requirements of older ICs becomes important. The ESD protection circuit is applicable where supply voltages are too high to be dropped across one thin gate oxide. The clamp circuit includes a switchable current sinking circuit 202 which is driven low by control circuit 204. The switchable current sinking circuit is fabricated as series coupled transistors 206 and 208 which form a conductive circuit between node 210 and ground. These two transistors may be switched on to conduct current, or, one or both may be switched off so that substantially no current flows. PFETs 206 and 208 can be laid out to be in the same n-well to eliminate a need for contacts at their common node.

The circuit of FIG. 2 includes a voltage divider circuit 216 which reduces the high supply voltage on node 210 to a smaller voltage on node 220, which is appropriate for long-term exposure on a single transistor gate oxide. Gate drive circuits 212 and 214 are provided to couple the transistor gate connections 218 and 220 to substrate ground. The drive circuits, therefore, turn on transistors 206 and 208 hard. One embodiment of the control circuit 204 is illustrated in FIG. 3.

Figure 3:
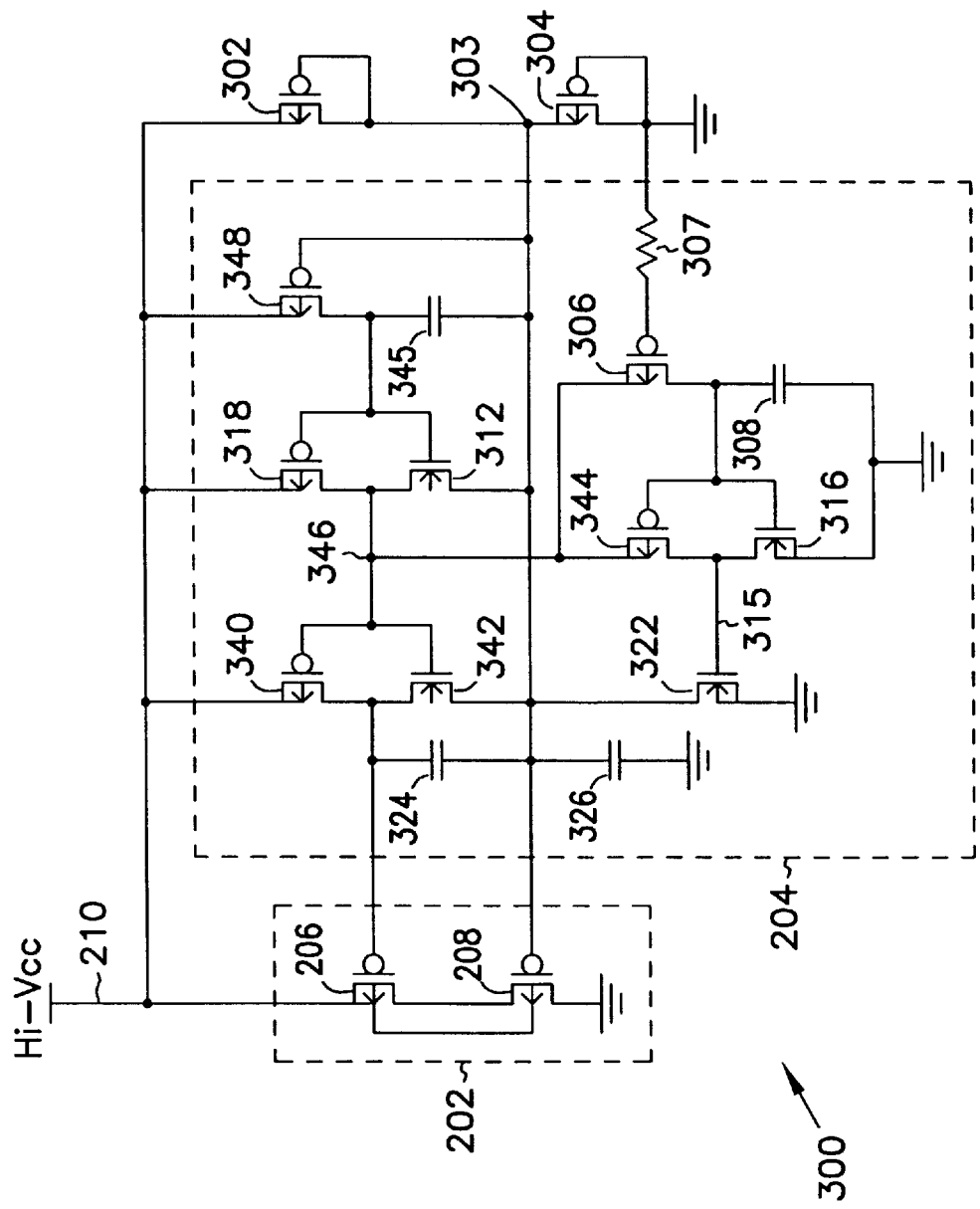
FIG. 3 is a clamp circuit having a stacked-gate PMOS transistor.

Referring to FIG. 3, one embodiment of a PMOS clamp circuit 300 for use in high voltage tolerant circuits is illustrated. The clamp circuit includes a switchable current sinking circuit 202 which is driven low by control circuit 204. The switchable current sinking circuit 202 includes stacked PMOS transistors 206 and 208. A voltage divider circuit of the clamp has a p-channel field effect transistor (PFET) 302 coupled between power supply node 210 and intermediate node 303. Another PFET 304 is coupled between node 303 and ground. PFETs 302 and 304 divide the high voltage from node 210 into a smaller voltage on node 303 which is appropriate for long-term exposure on a single transistor gate oxide.

Series coupled transistors 206 and 208 form a switchable conductive circuit between nodes 210 and ground. These two transistors may be switched on to conduct current, or, one or both may be switched off so that substantially no current flows. Those skilled in the art will recognize that some very small current may flow due to leakage or sub-threshold conduction mechanisms, but the transistors are still considered to be off. PFETs 206 and 208 can be laid out to be in the same n-well. In this way, PFETs 206 and 208 do not need contacts at their common node, thus allowing minimum spacing between the gate electrodes of the two transistors.

To achieve steady state low leakage current, it is only necessary to turn off one of the series coupled PFETs 206 and 208. Preferably, the transistor electrically adjacent to power supply node 210 is turned off to achieve the steady state low leakage current. This is accomplished when the gate of transistor 206 is pulled up to substantially the voltage of power supply node 210, through PFET 340. This happens when transistor 312 is activated as RC timer (345 and 348) settles down, as explained below.

One embodiment of drive circuit 214 of FIG. 2 includes transistors 306, 316, 322 and 344, and capacitor 308. The PFET 306 is coupled between node 346 and one terminal of capacitor 308 to form a first RC timer circuit. The gate terminal of PFET 306 and the second terminal of capacitor 308 are electrically connected to ground. Because transistor 306 will be exposed to a high voltage, temporarily, its gate is optionally coupled to ground by resistor 307. Transistors 344 and 316 are coupled to form a first inverter circuit with a pull-up voltage defined by node 346.

One embodiment of drive circuit 212 of FIG. 2 includes transistors 312, 318, 340, 342 and 348, and capacitor 345. An RC timer circuit is formed by transistor 348 and capacitor 345. Transistors 312 and 318 form an inverter coupled in series with another inverter formed by transistors 340 and 342. It is noted that transistors 306 and 344 are coupled to node 346, which is common with the two series inverters. Node 346 is used to couple a high pulsed voltage to the gates of transistors 342 and 322 to pull down the gates of transistors 206 and 208.

During non-ESD event operations, transistor 348 is activated by the voltage on node 303 to both charge capacitor 345 and activate transistor 312. Transistor 340 is then turned on to couple the gate of transistor 206 high. With transistor 312 activated, the source of transistor 306 is coupled to node 303. Transistors 306 and 312, therefore, charge capacitor 308 to a voltage substantially equal to node 303. Because node 346 is pulled low to the mid-voltage of node 303, transistor 340 also charges capacitor 324. Likewise, capacitor 326 is charged to the intermediate voltage of node 303. Transistors 206 and 208 are, therefore, turned off during non-ESD operations.

During an ESD event, the voltage on node 210 is pulled higher, and NFETs 322 and 342 pull the voltages on the gates of PFETs 206 and 208 to ground so that the double gate FET is turned on hard during an ESD pulse. That is, in response to an increase in the voltage on node 210, RC timer circuit 345 and 348 keep the gate voltage on transistor 318 sufficient to activate transistor 318 and couple node 346 to node 210. As a result, the gate connection of transistor 342 is pulled sufficiently high (close to node 210) to fully couple the gate of transistor 206 to node 303, without a Vt drop through transistor 342.

With the gate voltage of transistor 344 held substantially constant by RC timer 306 and 308, transistor 344 is activated when node 346 is pulled high. Thus, the elevated voltage on node 346 pulls the gate 315 of transistor 322 to a high voltage (node 346) through transistor 344. As a result, the gate voltage of transistor 322 is pulled sufficiently high to fully couple node 303 to ground, without a threshold voltage (Vt) drop through transistor 322. The stacked-gate PMOS clamp circuit 300, therefore, couples the gates of discharge transistors 206 and 208 to substrate ground during an ESD event. With the gates of transistors 206 and 208 fully coupled to ground, the ESD discharge path through transistors 206 and 208 can sink relatively large currents. Over a longer time period, the RC timer circuits charge capacitors 308 and 345 to flip the inverter circuits and turn off transistors 206 and 208.

Figure 4:
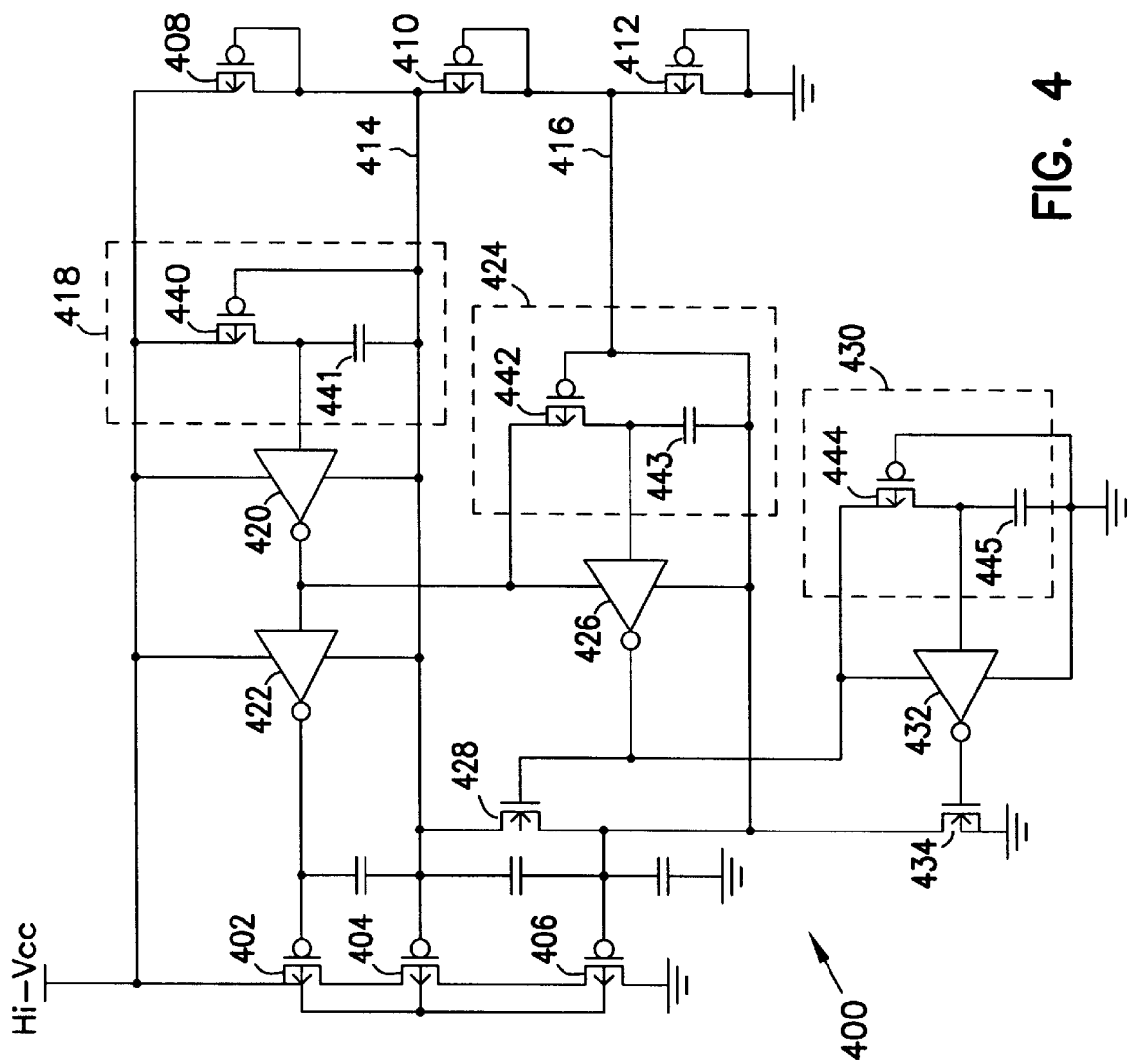
FIG. 4 is an alternate clamp circuit having a stacked-gate PMOS transistor.

Referring to FIG. 4, an alternate embodiment of a PMOS clamp circuit 400 for use in high voltage tolerant circuits is illustrated. The clamp circuit includes a switchable current sinking circuit including stacked PMOS transistors 402, 404 and 406. A voltage divider circuit of the clamp has a diode coupled PFET 408 coupled between the power supply and a first intermediate node 414. A second diode coupled PFET 410 is coupled between node 414 and a second intermediate node 416. A third diode coupled PFET 412 is coupled between the second intermediate node 416 and ground. Thus, the power supply potential is divided into two reduced voltages on nodes 414 and 416 which are appropriate for long-term exposure on a single transistor gate oxide.

Series coupled transistors 402, 404 and 406 form a switchable conductive circuit between hi-Vcc and ground. These transistors may be switched on to conduct current, or, one or all may be switched off so that substantially no current flows. Those skilled in the art will recognize that some very small current may flow due to leakage or sub-threshold conduction mechanisms, but the transistors are still considered to be off. PFETs 402, 404 and 406 can be laid out to be in the same n-well, thus allowing minimum spacing between the gate electrodes of the two transistors.

To achieve steady state low leakage current, it is only necessary to turn off one of the series coupled PFETs 402, 404 and 406. Preferably, the transistor electrically adjacent to power supply node is turned off to achieve the steady state low leakage current. This is accomplished when the gate of transistor 402 is pulled up to substantially the voltage of power supply node, through inverter 422. This happens when the input of inverter 420 is pulled high as RC timer 418 settles down, as explained below. The inverters of FIG. 4 are illustrated symbolically, and can be constructed as illustrated in FIG. 3. Because the clamp circuit uses three PFETs 402, 404 and 406, three pull-down devices 422, 428 and 434 are used to pull the gates of the PFETs to ground. The circuitry operates in substantially the same manner as the circuit of FIG. 3. That is, each PFET has a pull down device activated by an inverter circuit which has its supply pulled to a high voltage during an ESD event.

During non-ESD event operations, inverter 422 turns transistor 402 off. During an ESD event, the voltage on Vcc is pulled higher, and the voltages on the gates of PFETs 402, 404 and 406 are pulled to ground so that the multiple gate FET is turned on hard during an ESD pulse. That is, in response to an increase in the voltage on Vcc, RC timer circuit 418 keeps the input of inverter 420 sufficient to couple the inverter output to Vcc. As a result, the input of inverter 422 is pulled sufficiently high (close to Vcc) to fully couple the gate of transistor 402 to node 414, without a Vt drop through inverter 422.

With the input of inverter 426 held substantially constant by RC timer 424, the output of inverter 426 is coupled to Vcc through inverter 420. Thus, the elevated inverter output pulls the gate of transistor 428 to a high voltage. As a result, the gate voltage of transistor 428 is pulled sufficiently high to fully couple node 441 to node 416, without a threshold voltage (Vt) drop through transistor 428. Likewise, the input of inverter 432 held substantially constant by RC timer 430. The output of inverter 432, therefore, is coupled to Vcc through inverter chain 426 and 420. Thus, the elevated inverter output pulls the gate of transistor 434 to a high voltage. As a result, the gate voltage of transistor 434 is pulled sufficiently high to fully couple node 416 to ground, without a threshold voltage (Vt) drop through transistor 428.

The stacked-gate PMOS clamp circuit 400, therefore, couples the gates of discharge transistors 402, 404 and 406 to substrate ground during an ESD event. With the gates of these transistors fully coupled to ground, the ESD discharge path can sink relatively large currents. Over a longer time period, the RC timer circuits 418, 424 and 430 charge capacitors 441, 443 and 445 to flip the inverter circuits and turn off transistors 402, 404 and 406.

Figure 5:
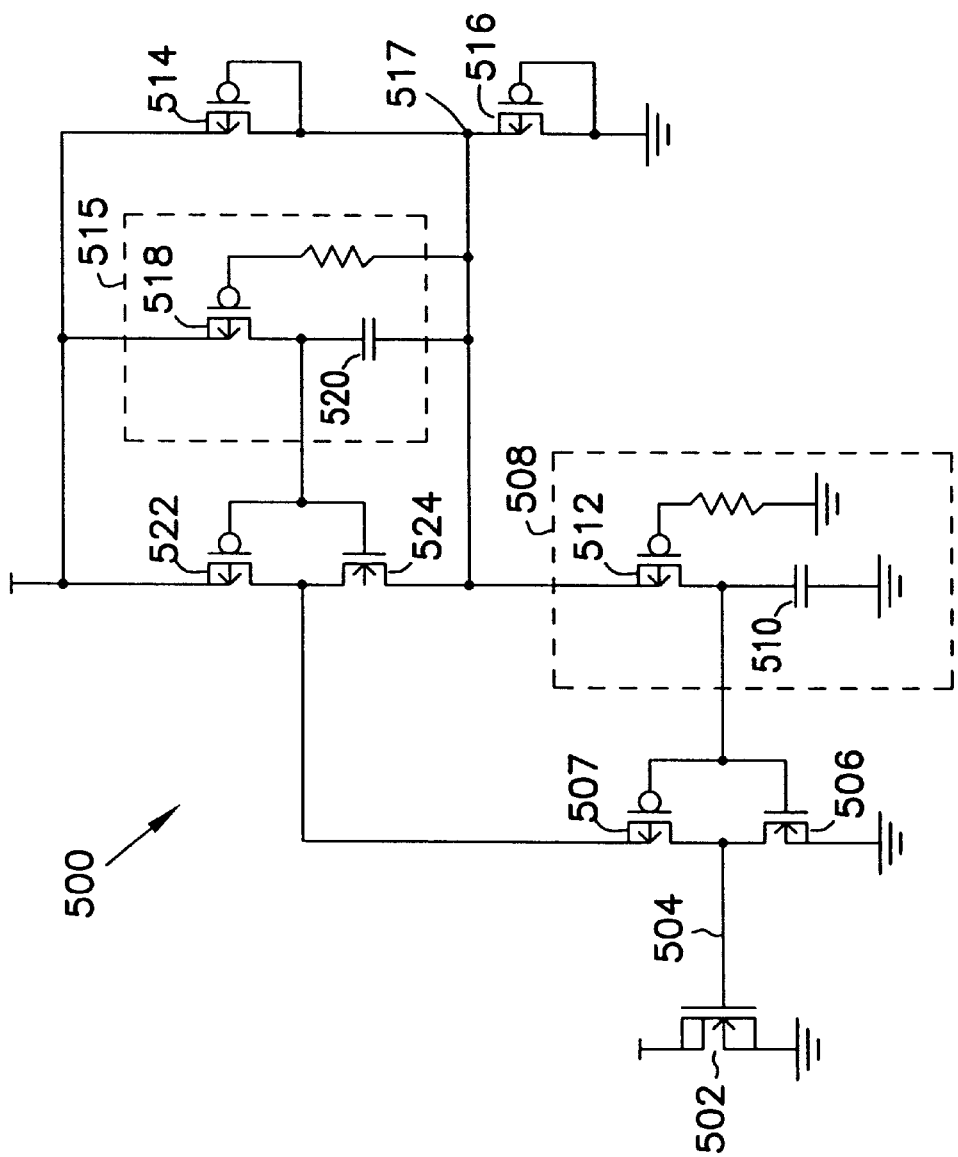
FIG. 5 is an alternate clamp circuit having a vertical-drain NMOS transistor.

In another embodiment, a large current sinking device can be used which is controlled by a relatively low voltage signal. For example, referring to FIG. 5, a vertical-drain NMOS transistor 502 can be used which can tolerate a high dc voltage on its drain connection, but can only sustain a large gate voltage for a short time duration. This is primarily due to limitations of the gate oxide layer. The gate 504 of the vertical drain transistor is coupled to ground during steady state operation by transistor 506 and RC network 508. That is, capacitor 510 is charged by transistor 512 and maintains a voltage which is close to the reference voltage on node 517. This reference, or Vref, voltage is defined by the voltage divider circuit of long-channel transistors 514 and 516. The clamp circuit 500 includes a first inverter formed by transistors 522 and 524 and a second inverter formed by transistors 506 and 507.

During an ESD event on the power supply connection, Vcc, transistor 522 is activated such that the inverter formed by transistors 522 and 524 provide a high output voltage. This high output voltage allows transistor 507 to turn on and couple the gate 504 of the vertical drain transistor 502 on hard. The vertical drain transistor, therefore, is activated to provide a high current sinking path. Capacitors 510 and 520 of the RC networks 508 and 515, respectively, are charged to a voltage level sufficient to turn off the pull up transistors of the two inverters. This limits the high voltage exposure of the gate of transistor 502, but allows for maximum current sinking. It will be appreciated by those skilled in the art that any switchable current sinking circuit which is capable of sinking large currents can be used, and the present invention is not limited to the vertical drain or PMOS transistors illustrated and described. Any switchable current sinking circuit which is limited in the voltage applied to its control can use the cascaded RC network/inverter circuitry described.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A power supply clamp circuit comprising:
    a plurality of series coupled p-channel field effect transistors forming a switchable current sinking circuit connected to a power supply; and
    a control circuit coupled to a control connection of the switchable current sinking circuit, the control circuit adapted to couple the control connection to a ground potential such that a voltage drop from the control connection to the ground potential is less than a threshold voltage of an n-channel field effect transistor during an electrostatic discharge event on the power supply connection.

2. The power supply clamp circuit of claim 1 wherein the control circuit comprises:
    a plurality of gate drive circuits, each one of the plurality of gate drive circuits is coupled to a gate of one of the plurality of series coupled transistors for coupling the gate to ground during the electrostatic discharge event.

3. The power supply clamp circuit of claim 1 further comprising a voltage divider circuit coupled to the switchable current sinking circuit for reducing a power supply voltage.

4. A power supply clamp circuit comprising:
    a switchable current sinking circuit connected to a power supply, the switchable current sinking circuit comprises a plurality of series coupled transistors; and
    a control circuit coupled to a control connection of the switchable current sinking circuit, the control circuit adapted to couple the control connection to ground without au appreciable voltage drop during an electrostatic discharge event on the power supply connection, wherein the control circuit comprises a plurality of gate drive circuits, each one of the plurality of gate drive circuits is coupled to a gate of one of the plurality of series coupled transistors for coupling during the electrostatic
    wherein each one of the plurality of gate drive circuits comprises:
        a pull down circuit; and
        an RC timer circuit adapted to control the pull down circuit during the electrostatic discharge event.

5. The power supply clamp circuit of claim 4 wherein the pull down circuit comprises at least one N-channel transistor connected to a gate of one of the plurality of series coupled transistors.

6. A power supply clamp circuit comprising:
    a switchable current sinking circuit connected to a power supply; and
    a control circuit coupled to a control connection of the switchable current sinking circuit, the control circuit adapted to couple the control connection to ground without an appreciable voltage drop during an electrostatic discharge event on the power supply
    wherein the control circuit comprises an inverter chain adapted to be coupled to the power supply connection experiencing the electrostatic discharge event to activate the switchable current sinking circuit.

7. A power supply clamp circuit comprising:
    a plurality of p-channel field effect transistors connected in series between a power supply connection and ground; and
    a control circuit coupled to gates of the plurality of p-channel transistors, the control circuit adapted to couple the gates to ground during an electrostatic discharge event on the power supply connection, such that a voltage drop from the gates of the plurality of field effect transistors to ground is less than a threshold voltage of an n-channel field effect transistor.

8. The power supply clamp circuit of claim 7 wherein the control circuit comprises a plurality of gate drive circuits, each one of the plurality of gate drive circuits is coupled to a gate of one of the plurality of series coupled transistors for coupling the gate to ground during the electrostatic discharge event, each one of the plurality of gate drive circuits comprises:
    a pull down circuit; and
    an RC timer circuit adapted to control the pull down circuit during the electrostatic discharge event.

9. The power supply clamp circuit of claim 7 wherein the control circuit comprises:
    a voltage divider circuit;
    a first RC timer circuit;
    a first inverter having an input connection coupled to the first RC timer circuit;
    a second inverter having an input connection coupled to an output connection of the first inverter, the second inverter has an output connection coupled to a gate of a first one of the series connected plurality of transistors, the first and second inverters each having a pull-up circuit connected to the power supply connection, and a pull-down circuit connected to an output connection of the voltage divider circuit;
    a second RC timer circuit;
    a third inverter having an input connection coupled to the second RC timer circuit, the third inverter having a pull-up circuit connected to the output connection of the second inverter, and a pull-down circuit coupled to ground; and
    a pull-down transistor coupled to both a gate of a second one of the series connected plurality of transistors and ground, a gate of the pull-down transistor is connected to an output connection of the third inverter circuit.

10. A power supply clamp circuit comprising:
    a plurality of transistors connected in series between a power supply connection and ground; and
    a control circuit coupled to gates of the transistors, the control circuit adapted to couple the gates to ground during an electrostatic discharge event on the power supply connection,
    wherein the control circuit comprises an inverter chain adapted to be coupled to the power supply connection experiencing the electrostatic discharge event to activate pull down circuitry coupled to the plurality of series coupled transistors.

11. The power supply clamp circuit of claim 10 wherein the pull down circuitry comprises a plurality of N-channel transistors each connected to a gate of one of the plurality of series coupled transistors.

12. A power supply clamp circuit comprising:
    series connected p-channel transistors, fabricated as a dual gate transistor having a shared well, connected between a power supply connection and ground for providing a discharge path during an electrostatic discharge event on the power supply connection; and
    a control circuit coupled to gates of the series connected p-channel transistors, the control circuit adapted to couple the gates of the series connected p-channel transistors to substrate ground during the electrostatic discharge event.

13. The power supply clamp circuit of claim 12 wherein the control circuit comprises:

a plurality of n-channel pull-down transistors coupled to the gates of the series connected p-channel transistors; and gate drive circuitry coupled to gates of the plurality of n-channel pull-down transistors for driving the gates of the plurality of n-channel pull-down transistors to a voltage potential substantially equal to a power supply potential.

14. The power supply clamp circuit of claim 13 wherein the gate drive circuitry comprises an inverter chain adapted to be coupled to the power supply connection experiencing the electrostatic discharge event to activate the plurality of n-channel pull-down transistors.

15. The power supply clamp circuit of claim 12 wherein the control circuit comprises:

a voltage divider circuit;

a first RC timer circuit;

a first inverter having an input connection coupled to the first RC timer circuit;

a second inverter having an input connection coupled to an output connection of the first inverter, the second inverter has an output connection coupled to a gate of a first one of the series connected p-channel transistors, the first and second inverters each having a pull-up circuit connected to the power supply connection, and a pull-down circuit connected to an output connection of the voltage divider circuit;

a second RC timer circuit;

a third inverter having an input connection coupled to the second RC timer circuit, the third inverter having a pull-up circuit connected to the output connection of the second inverter, and a pull-down circuit coupled to ground; and a pull-down transistor coupled to both a gate of a second one of the series connected p-channel transistors and ground, a gate of the pull-down transistor is connected to an output connection of the third inverter circuit.

16. An integrated circuit comprising:

a power supply connection for receiving a power supply voltage;

internal circuitry for performing a predetermined function; and a power supply clamp circuit for providing a discharge path during an electrostatic discharge event on the power supply connection, the power supply clamp circuit comprising, a plurality of p-channel field effect transistors connected in series between a power supply connection and ground; and a control circuit coupled to gates of the plurality of p-channel transistors, the control circuit adapted to couple the gates to ground during an electrostatic discharge event on the power supply connection, such that a voltage drop from the gates of the plurality of field effect transistors to ground is less than a threshold voltage of an n-channel field effect transistor.

17. The integrated circuit of claim 16 wherein the control circuit comprises a plurality of gate drive circuits, each one of the plurality of gate drive circuits is coupled to a gate of one of the plurality of series coupled transistors for coupling the gate to ground during the electrostatic discharge event.

18. The integrated circuit of claim 17 wherein each one of the plurality of gate drive circuits comprises:

a pull down circuit; and an RC timer circuit adapted to control the pull down circuit during the electrostatic discharge event.

19. A power supply clamp circuit comprising:

a switchable current sinking circuit connected to a power supply for providing a current sinking path for use during electrostatic discharge events on the power supply; and a control circuit connected to a control connection of the switchable current sinking circuit, the control circuit including an RC network adapted to limit exposure of high voltage to the control connection to a predetermined time, the control circuit further comprises a voltage divider circuit for providing a reference voltage, and first and second inverters having an input coupled to first and second RC networks.

20. The power supply clamp circuit of claim 19 wherein the switchable current sinking circuit is a vertical drain NMOS transistor.

21. The power supply clamp circuit of claim 19 wherein the first inverter has a pull-up circuit coupled to the power supply connection and a pull-down circuit coupled to the reference voltage.

22. The power supply clamp circuit of claim 19 wherein the second inverter has a pull-up circuit coupled to an output of the first inverter and a pull-down circuit coupled to ground.

23. The power supply clamp circuit of claim 19 wherein the control circuit comprises:

a voltage divider circuit;

a first RC timer circuit;

a first inverter having an input connection coupled to the first RC timer circuit, the first inverter having a pull-up circuit connected to the power supply connection, and a pull-down circuit connected to an output connection of the voltage divider circuit;

a second RC timer circuit; and a second inverter having an input connection coupled to the second RC timer circuit, the second inverter has an output connection coupled to the switchable current sinking circuit, the second inverter having a pull-up circuit connected to the output connection of the first inverter, and a pull-down circuit connected to ground.

* * * * *

UNITED STATES PATENT AND TRADEMARK OFFICE
CERTIFICATE OF CORRECTION

PATENT NO.: 5,956,219

DATED: Sep. 21, 1999

INVENTOR(S): Maloney

It is certified that error appears in the above-identified patent and that said Letters Patent is hereby corrected as shown below:

In column 7, line 35, delete "au" and insert -- an --, therefor.

In column 7, line 40, insert -- the gate to the ground -- after "coupling", therefor.

In column 7, line 41, insert -- discharge event; and -- after "electrostatic", therefor.

In column 7, line 59, insert -- connection,-- after "supply", therefor.

Signed and Sealed this

Fifth Day of December, 2000

Attest:

Q. TODD DICKINSON

*Attesting Officer*  *Director of Patents and Trademarks*